3,403,945
VEHICLE ANTI-SKID BRAKING SYSTEM
Douglas Dewar, Wolston, near Coventry, John Walter Davis, Balsall Common, Coventry, and Frank Radcliffe Mortimer, Styvechale, Coventry, England, assignors to Dunlop Rubber Company Limited, London England, a British corporation
Filed Apr. 28, 1966, Ser. No. 546,029
Claims priority, application Great Britain, May 4, 1965, 18,851/65
21 Claims. (Cl. 303—21)

ABSTRACT OF THE DISCLOSURE

A vehicle braking system is provide with a hydraulic brake operating mechanism for a set of vehicle wheels and a skid sensing device associated with the vehicle wheel constructed to operate a relay valve to reduce pressure on the control cylinder which can shut off pressure from the hydraulic brake applying system to the brakes and reduce the brake applying pressure until such time that the wheels can obtain a restored speed as sensed by the inertia device.

---

This invention relates to vehicle anti-skid braking systems and particularly to systems of the kind which incorporates a skid-sensing device arranged to release at least one of the brakes of the vehicle whenever an associated wheel is about to lock and skid.

According to the invention, a vehicle braking system comprises a hydraulic brake operating mechanism associated with the brake of at least one wheel of the vehicle and connected to a source of hydraulic pressure, a valve for interrupting the connection between the source of hydraulic pressure and the brake operating mechanism, a plunger movable in a cylinder connected to the brake operating mechanism and arranged to control the hydraulic pressure therein after the valve has interrupted the connection between the source of hydraulic pressure and the brake operating mechanism, means for controlling the position of the plunger comprising a pneumatically operated servo device arranged to apply a thrust to the plunger, the operation of the servo device being controlled by a relay valve, and a skid-sensing device associated with the vehicle wheel and arranged to operate the relay valve so as to cause the thrust exerted on the plunger by the servo device to be reduced when the wheel tends to lock.

Where reference is made, in the preceding paragraph, to a pneumatically operated servo device it will be understood that the term "pneumatic" embraces operation by air at a pressure greater than atmospheric pressure or by air at a pressure below atmospheric pressure, or in other words, by air pressure or vacuum.

In a preferred arrangement of considerable practical value, the braking system defined above is applied to the rear wheel brakes of the tractor portion of an articulated vehicle.

When an articulated vehicle, comprising a tractor portion and a semi-trailer portion is braked on a slippery road surface or in an unladen condition on any surface there is a tendency, as in all road vehicles, for the rear wheels of the tractor portion to lock and for a skid to develop. When this occurs, the resulting sideways drift of the rear wheels of the tractor portion sets up a corresponding movement of the forward end of the semi-trailer, and it is difficult to prevent a situation arising in which the tractor rotates about a vertical axis and collides with its own semi-trailer. This process is known as "jack-knifing."

In order to reduce the danger of jack-knifing the rear brakes of the tractor are operated and controlled by an anti-skid braking system in accordance with the invention.

Various embodiments of the anti-skid braking system according to the invention will now be described with reference to the accompanying drawings, in which.

Figure 1:
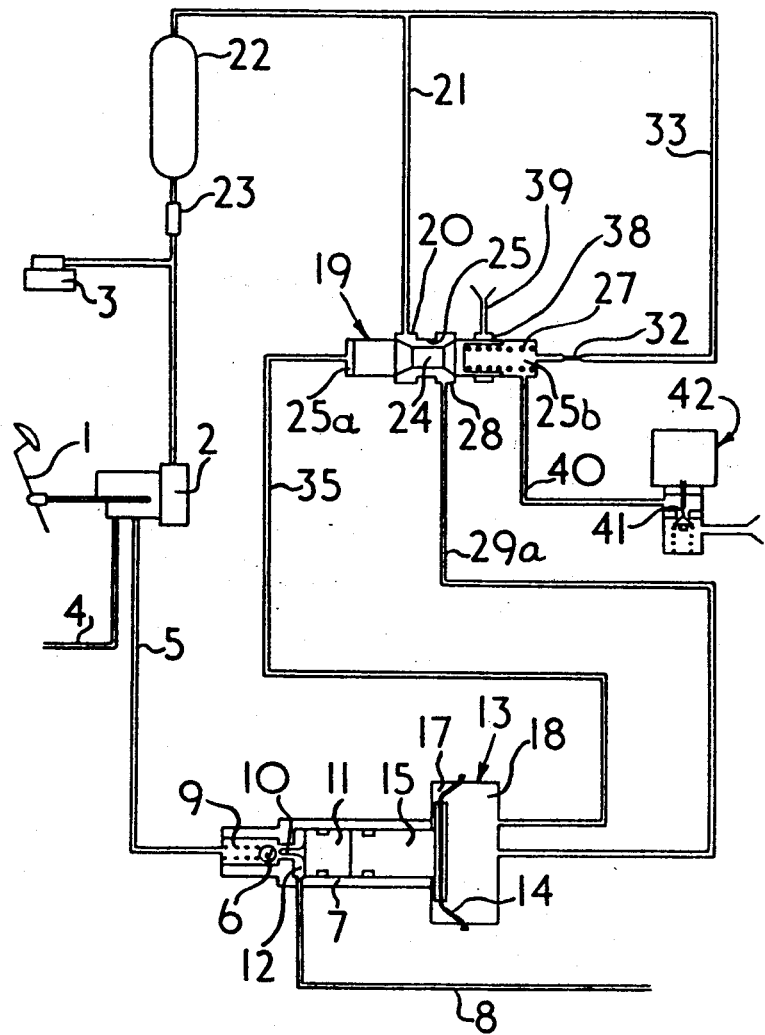
FIGURE 1 is a diagrammatic illustration of an anti-skid braking system as applied to the rear wheels of the tractor portion of an articulated vehicle.
Figure 2:
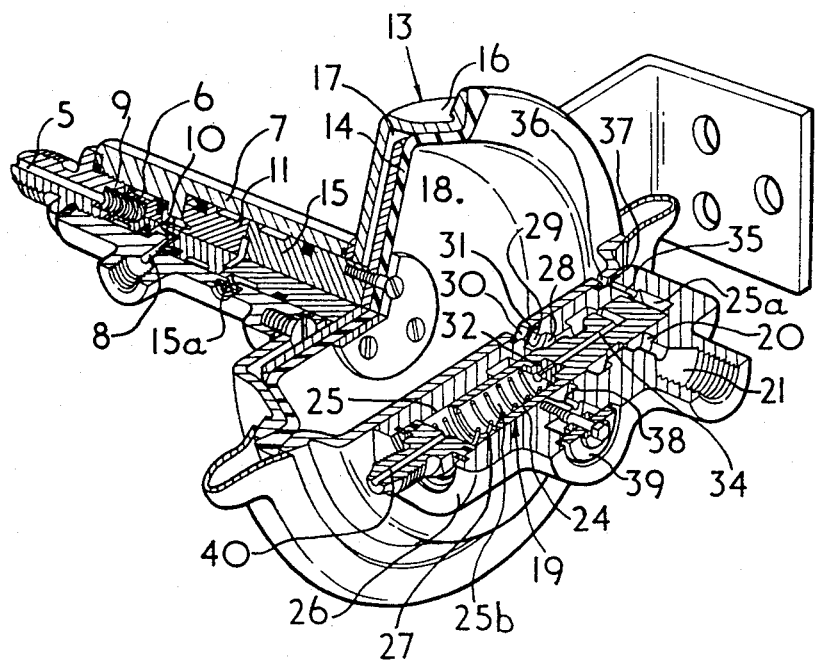
FIGURE 2 is a diagrammatic, partly cut-away, perspective view showing a practical form of part of the system illustrated in FIGURE 1.
Figure 3:
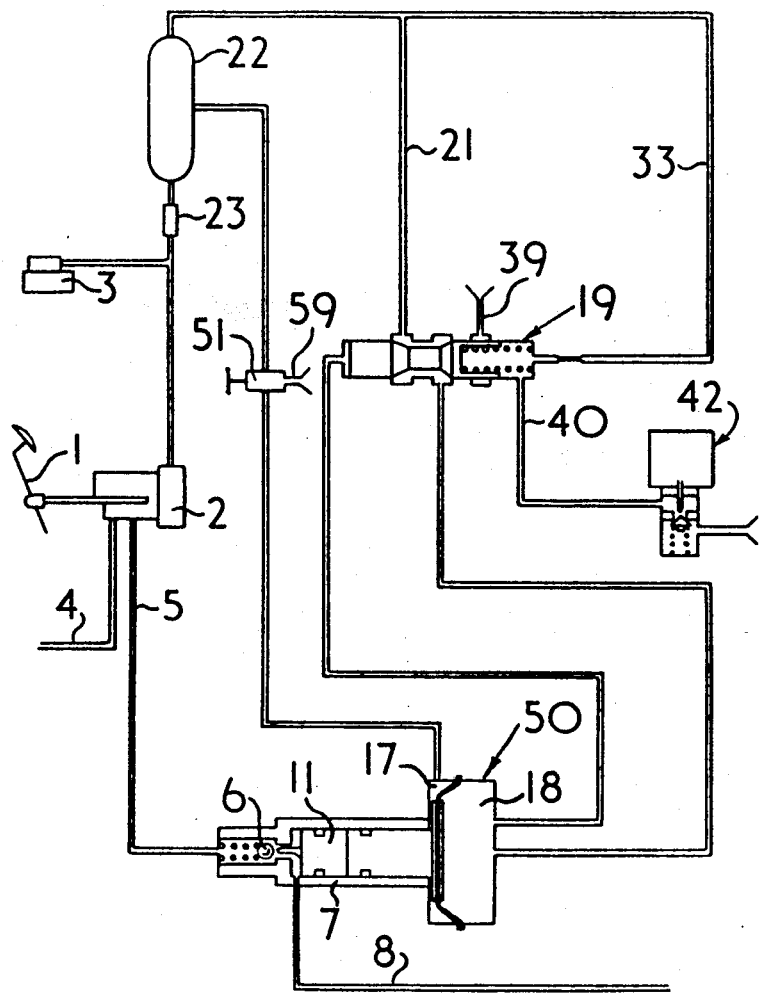
Figure 4:
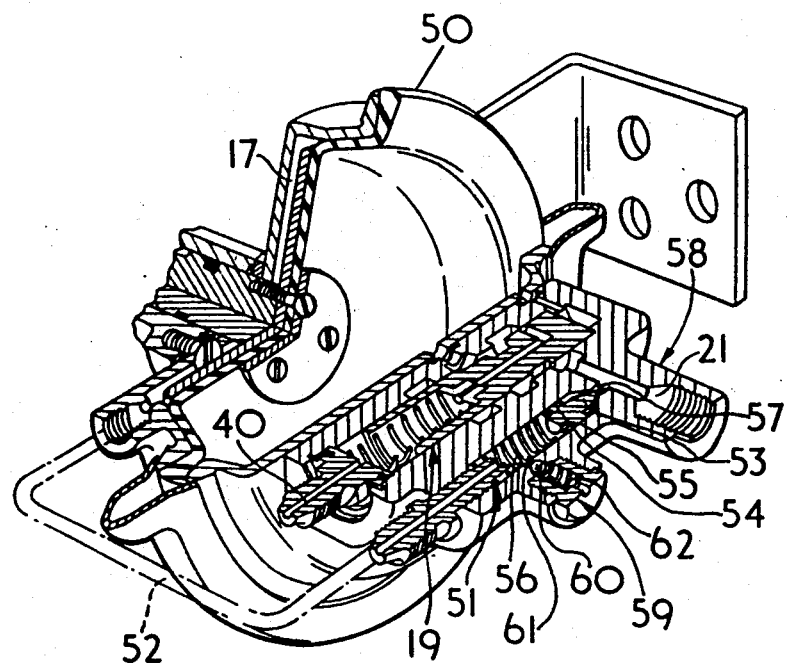
Figure 5:
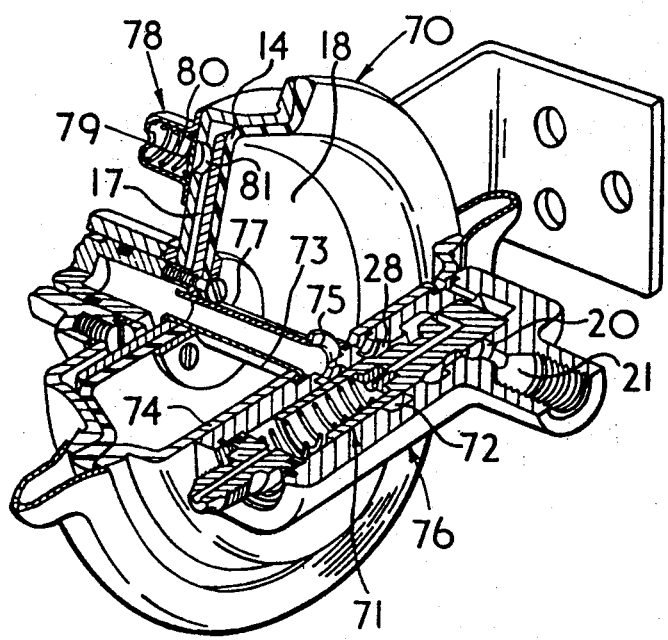
Figure 6:
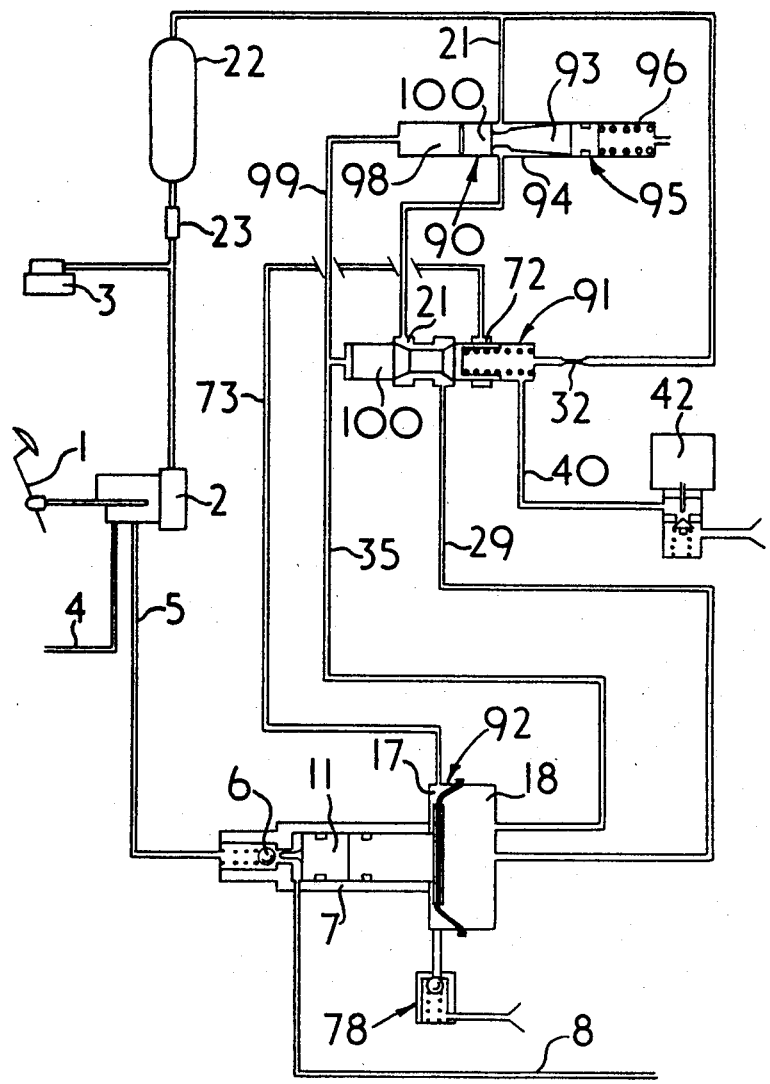
Figure 7:
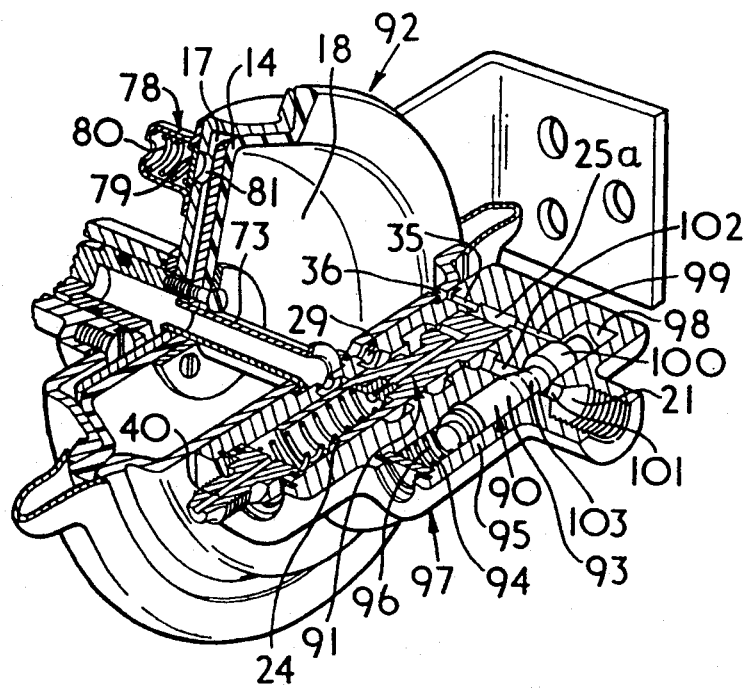

FIGURES 3 and 4 correspond respectively to FIGURES 1 and 2 and illustrate a modified form of the system shown in FIGURES 1 and 2;

FIGURE 5 is a diagrammatic perspective view showing part of a further modified form of the system shown in FIGURES 1 and 2;

FIGURES 6 and 7 correspond respectively to FIGURES 1 and 2 and illustrate a further modified form of the system shown in FIGURES 1 and 2;

FIGURES 8, 9, 10 and 11 are diagrammatic illustrations showing other modified forms of the system shown in FIGURES 1 and 2.

In the following description similar reference numerals have been used to indicate identical components of the various embodiments.

In the braking system for the tractor portion of an articulated vehicle shown in FIGURE 1, the brakes (not illustrated) are of conventional form, one brake being associated with each wheel and being of either the disc or drum type. The brakes are operated by a conventional hydraulic system controlled by a driver's foot pedal 1 which acts on a conventional power-assisted master cylinder 2, the power assistance being derived from pneumatic pressure supplied by a compressor 3 driven by the engine of the vehicle. A hydraulic line 4 conveys operating pressure to the front brakes of the tractor portion of the vehicle.

A hydraulic line 5 to the rear brakes of the tractor portion contains a spring-loaded cut-off valve 6 which when closed isolates the brakes from the source of hydraulic pressure. The cut-off valve 6 is mounted at one end of a cylinder 7 which is connected to the brakes by a side connection 8 adjacent the cut-off valve, and is normally held, against the pressure of a spring 9, in its open position by a projection 10 formed on the end of a plunger 11 which is fluid-tightly slidable in the bore of the cylinder 7. The arrangement is such that when the cut-off valve is closed movement of the plunger 11 away from the valve 6 increases the volume of the space 12 at the end of the cylinder 7. A corresponding volume of fluid from the rear brakes can return into the increased space 12, with a consequent reduction in the brake-applying pressure.

The position of the plunger 11 in its cylinder 7 is controlled by a pneumatically operated servo device 13 which is of conventional form and comprises a movable member in the form of a diaphragm 14 of large area compared with that of the plunger 11, the diaphagm being connected to a second plunger 15 also slidable in the bore of the cylinder 7 and abutting the plunger 11. A vent 15a is provided, communicating with the space between the plunger 15 and the plunger 11 to ensure that there is no tendency for the plunger 11 to be drawn towards the servo device 13 as the plunger 15 moves in that direction. If the vent 15a were not provided there would be a danger that air might be drawn into the hydraulic system as the plunger 11 was drawn towards the servo device. The diaphragm 14 is mounted in a housing 16 which comprises a pair of chambers 17 and 18 on opposite sides of the diaphragm 14. The first chamber 17, adjacent the plunger 11 is vented to atmosphere and the second chamber 18 is supplied with air at pressures which are controlled by a system to be described.

The pneumatic system for operating the servo device 13 comprises a relay valve 19 having a port 20 connected to an air pressure line 21 from an air reservoir 22 which is supplied through a filter 23 from the compressor 3, the relay valve 19 being arranged, in the normal state of the system, to connect the air pressure line 21 to the chamber 18 of the servo device. The relay valve 19 consists of a spool valve member 24 slidable in a cylindrical bore 25 of a valve housing 26 and urged by a spring 27 towards one end of the bore, in which position the connections are as described above, the port 20 being in communication with a port 28 connected through a line 29a (see FIGURE 1) with the chamber 18. It will be noted that in the practical arrangement shown in FIGURE 2 the relay valve housing 26 is secured to the wall of the second chamber 18 of the servo device 13, the housing 26 and the wall of the chamber 18 having communicating openings 29, 30 respectively, sealed from atmosphere by a sealing ring 31, to provide communication between the port 28 and the chamber 18. The cylindrical bore 25 of the relay valve housing 26 is connected, at the end 25a towards which the valve member 24 is urged by the spring 27, to the chamber 18 of the servo device, and at its other end 25b through a restrictor 32 and line 33 to the air reservoir 22 (see FIGURE 1).

As shown in FIGURE 2, the restrictor 32 is contained as an insert in the spool valve member 24, and the line 33 takes the form of a drilled passage 34 which communicates with the air inlet port 20 in all positions of the member 24. The connection of the end 25a of the bore 25 to the chamber 18 is made by means of a passage 35 formed in the relay valve housing 26 and communicating with an opening 36 in the wall of the chamber 18, a sealing ring 37 being provided around the opening 36.

An exhaust port 38, leading through a dirt-excluding rubber flap valve 39 to atmosphere, is formed in the housing 26 and the arrangement is such that when the valve member 24 is moved to the opposite end of the bore 25 from the position shown in FIGURES 1 and 2, the connection between the port 28 leading to the chamber 18 and the air inlet port 20 is interrupted and the port 28 is connected to the exhaust port 38.

The end 25b of the bore 25 is connected through a line 40 to a spring-closed valve 41 contained in a device 42. The device 42 is a rotary-inertia unit of conventional form which is driven by a belt drive from the vehicle propellor shaft, and is arranged to open the valve 41 to connect the line 40 to atmosphere whenever the deceleration of the propellor shaft is greater than a predetermined value, indicating that the rear wheels of the tractor are about to lock.

In the normal state of the system described above, as shown in FIGURES 1 and 2, the ends 25a, 25b of the bore 25 of the relay valve housing 26 are both supplied with pneumatic pressure, and since the valve 41 is normally closed these pressures are equal. The spring 27 therefore maintains the valve member 24 in the position shown, with the chamber 18 of the servo device connected to the pneumatic pressure supply. The resultant force applied by the servo device 13 to the plunger 11 ensures that the plunger 11 is held in the position shown, holding the cut-off valve 6 open, the hydraulic pressure in the line 5 being insufficient to move the plunger 11 against the force generated by the servo device 13. The brakes can therefore be applied and released by the driver in the normal manner.

When the skid-sensing device 42 is caused to open its valve 41, on sensing an imminent wheel-locking condition, air pressure is allowed to escape from the end 25b of the relay valve bore through the valve 41. Since the flow of air from the reservoir 22 to the end 25b of the bore 25 is restricted, the pressure at this end of the valve bore falls and the spool valve member 24 moves away from its normal position at the opposite end of the bore. The spool valve member thus acts to disconnect the chamber 18 of the servo device from the air pressure line 21 and connect the chamber 18 to atmosphere. This tends to equalize the pressures on each side of the servo piston, and the hydraulic pressure in the brakes is then able to force the plunger 11 back along its cylinder, closing the cut-off valve 6, the pressure in the brakes then being reduced as the plunger 11 is pushed back by the hydraulic pressure to increase the volume of the space 12 into which the fluid in the rear brake-applying mechanisms can expand.

The relief of brake pressure caused by the movement of the plunger 11 will continue until the braking effect has been sufficiently reduced to allow the rear wheels of the tractor to regain a rotational speed sufficient to cause the skid-sensing device 42 to close its valve 41. This enables air pressure to build up again in the associated end 25b of the relay valve bore, and the spool valve member 24 is moved back to the position shown in the drawings so as to close the exhaust port 38 and permit air to flow again to the chamber 18 of the servo device, the pressure building up in the chamber 18 to move the plunger 11 towards the ball valve. This return movement of the plunger along its cylinder forces the hydraulic fluid back to the brakes to re-apply the brakes, and if no further skid occurred the plunger would move to the end of its cylinder and open the cut-off valve to restore normal operation of the brakes.

Usually, however, the wheel will again tend to skid before the plunger has moved a sufficient distance along its cylinder to re-open the cut-off valve, and the skid-sensing device will again cause the relay valve 19 to operate to release the pressure in the servo device 13. The second incipient skid is then checked as the plunger 11 moves back along its cylinder to release the brakes, and the skid-sensing device and the relay valve will then again operate to supply air pressure to the servo device until the next tendency to skid is detected. Each release and re-application of the brakes takes place vary rapidly, and the system continues cyclically to release and re-apply the brakes until the brakes are released by the driver, or road conditions change so as to enable full braking pressure to be used again, or the vehicle comes to rest.

In the modified form of the system as shown in FIGURES 3 and 4, the servo device 50 incorporates chambers 17 and 18 and a diaphragm 14 as in the servo device 13 shown in FIGURES 1 and 2, but instead of venting the chamber 17 to atmosphere this chamber is maintained at a low predetermined pressure by means of a pressure reducing valve 51 connected to the air pressure supply from the reservoir 22 and communicating by means of a pipe 52 with the chamber 17.

The reducing valve 51 comprises a needle valve member 53 comprising a plunger portion 54 slidable in a bore 55 and urged by means of a spring 56 against an orifice 57 connected to the air inlet port of the relay valve housing 58. The reducing valve is also provided with a pressure relief valve 59 comprising a ball valve member 60 loaded against an orifice 61 by a spring 62 and arranged to release pressure from the chamber 1 whenever the pressure within the chamber tends to increase above the predetermined level, for example on movement of the diaphragm to re-apply the brakes following an operation of the system to release the brakes.

The other components contained in the relay valve housing 58 are similar to those of the housing 26 shown in FIGURE 2. The outlet 39 from the exhaust port 38 to atmosphere is not shown in FIGURE 4.

The function of the reducing valve 51 is to ensure that no residual pressure is applied by the plunger 11 to the brake fluid after the control system has operated to release the brakes completely. The reducing valve maintains a small pressure in the chamber 17 of the servo device which balances any residual pressure which remains in the chamber on the other side of the servo piston, as a result of the restriction offered by the relay valve connections to the flow of air from the chamber 18 to exhaust. If the chamber 17 adjacent the plunger is connected to exhaust without restriction, as in the embodiment shown in FIGURES 1 and 2, a residual pressure difference might arise which would be sufficient to cause a certain amount of pressure to be applied to the brakes even when the system was in operation to correct a skid, and this would be undesirable.

In the embodiment shown in FIGURE 5, the servo device 70 and relay valve 71 are arranged so that when the relay valve is operated it cuts off the air pressure supply through line 21 and ports 20, 28 to the chamber 18, and establishes a connection from the chamber 18 to the chamber 17 through port 28 and a transfer port 72 which leads into an axially extending tube 73 secured at one end to the wall 74 of the chamber 18 by a flange 75 which is sealed to the wall 74 and the relay valve housing 76. The tube 73 passes through a central opening 77 in the diaphragm 14 in fluid-tight sliding engagement therewith to communicate at its other end with the chamber 17, the tube 73 thus providing a passage between the two chambers when the relay valve is operated.

The function of the tube 73 is to equalise the pressures in the chambers 17, 18 when the relay valve 71 is operated and thus to cancel the thrust exerted by the diaphragm 14 on the plunger 11. As in the previously described embodiments a residual pressure difference might still arise between the chambers 17 and 18, and to ensure that this does not occur a pressure relief valve 78 is provided on the servo device 70 to ensure that a predetermined pressure is retained in the chamber 17. The valve 78 comprises a rubber valve disc 79 urged by a spring 80 towards a position in which it closes an orifice 81 leading to the chamber 17.

While the pressure relief valve 78 is shown in FIGURE 5 in a position on the body of the servo device 70, in an alternative arrangement (not illustrated), the pressure relief valve could be mounted on the relay valve housing.

In operation, when the chambers 17 and 18 are connected together by the relay valve, the pressure in the chambers escapes continuously through the pressure relief valve 78.

FIGURES 6 and 7 illustrate a system of the kind shown in FIGURE 5, in which a variable flow restrictor 90 is placed in the air supply line 21 which is connected via the relay valve 91 to the chamber 18 of servo device 92. The restrictor 90 is described in more detail in our co-pending U.K. patent application No. 18,850/65 and consists of a restrictor valve member 93 movable in a cylindrical bore 94 of a restrictor valve housing 95 against a restrictor return spring 96. The housing 95 is integral with the relay valve housing 97, and the end 98 of the bore 94 is supplied with air pressure from the chamber 18 through a drilling 99. The pressure in the end 98 of the bore acts on a restrictor plunger 100 so as to tend to move the restrictor member 93 away from the end 98. The air pressure fed to the relay valve 91 passes from the inlet 21 through openings 101 and 102 at opposite sides of the bore 94 and thus has to flow across the bore 94, which contains the restrictor member 93. The member 93 has a tapered portion 103 which provides a greater obstruction to the flow of air when the member is moved towards the end 98 by the spring 96 and provides less obstruction when the pressure in the end 98 is sufficient to move the member 93 in the opposite direction. The valve member 93 thus presents a restriction to the flow of air pressure to the chamber 18 of the servo device 92 which varies in accordance with the pressure already existing in that chamber. The arrangement is such that a relatively restricted flow of air is provided when the pressure in the chamber 18 is low and a relatively less restricted flow of air is provided when the pressure in the chamber 18 is high.

During the cyclical operations of the system described above the maximum pressure which is allowed to be built up in the servo device is dependent on the prevailing road or vehicle loading conditions, only a relatively low maximum pressure being achieved when conditions are such that a skid is easily provoked by application of the brakes, whereas under more favourable road or loading conditions the maximum pressure arising in the cyclical variations of pressure in the servo device will be relatively high. The effect of the flow restrictor 90 is that when the brakes are re-applied following a skid, the rate at which pressure is built up in the servo device 92 is reduced when the pressure in the chamber 18 of the servo device is varying cyclically at a low level and the rate at which pressure is built up is increased when the pressure in the chamber 18 is varying at a relatively high level.

The operation of the variable flow restrictor 90 as described above has the result that when the vehicle skids on a surface which is very slippery the re-application of the brakes takes place relatively gradually. When the surface offers a better grip, however, the brakes are re-applied by the system with a higher rate of pressure build-up.

It should be noted that in order that the variable flow restrictor will be able to function in the manner described, the pressure at which air is supplied from the reservoir 22 should be considerably in excess of the pressure required by the servo device to balance the hydraulic pressure corresponding to the maximum brake operating pressure.

Figure 8:
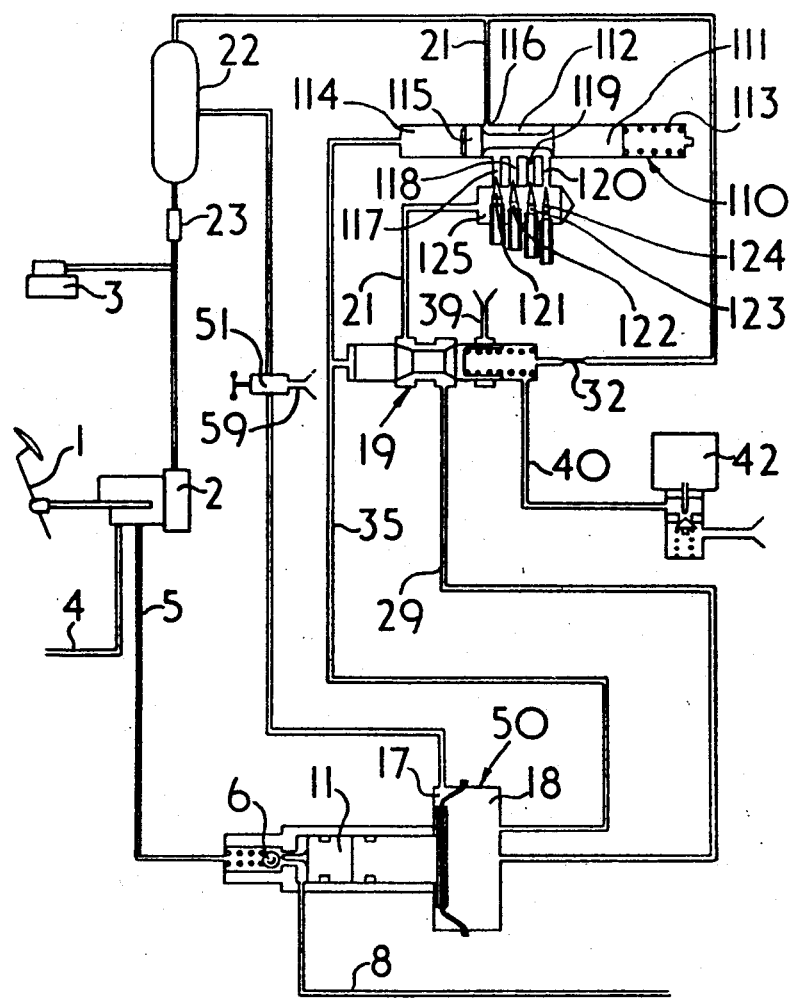

FIGURE 8 shows a system of the kind illustrated in FIGURES 3 and 4, incorporating a pressure reducing valve 51 to feed a predetermined pressure to the chamber 17 of the servo device 50, and also incorporates a modified form of variable flow-restrictor 110 in the line 21.

The restrictor 110 comprises a restrictor valve member 111 movable in a cylindrical bore 112 against a restrictor return spring 113. The end 114 of the bore is connected by the line 99 to the chamber 18 and a restrictor plunger 115 attached to the member 111 is subjected to the pressure in the chamber 18 so that it tends to move the member 111 away from the end 114.

The bore 112 has an opening 116 on one side and has on the diametrically opposite side a series of openings 117, 118, 119, 120, each opening of the series being arranged so that it can be closed by the valve member 111 and the openings 117, 118, 119, 120 being provided, respectively with needle valves 121, 122, 123, 124 through which air can flow to a common passage 125 leading to the relay valve 19.

The needle valves 121, 122, 123, 124 are adjusted to present a series of orifices of graduated sizes, the arrangement being such that the series of orifices can be opened in succession by movement of the member 111 along the bore 112. FIGURE 8 shows all the orifices open: this condition arises when the pressure in chamber 18 is high, and provides a relatively reduced obstruction to the flow of air across the bore compared to the condition when the pressure in the chamber 18 is low, allowing the member 111 to move to a position in which it closes one or more of the orifices.

The restrictor 110 shown in FIGURE 8 has the advantage that its characteristics can easily be altered by adjusting the needle valves.

Figure 9:
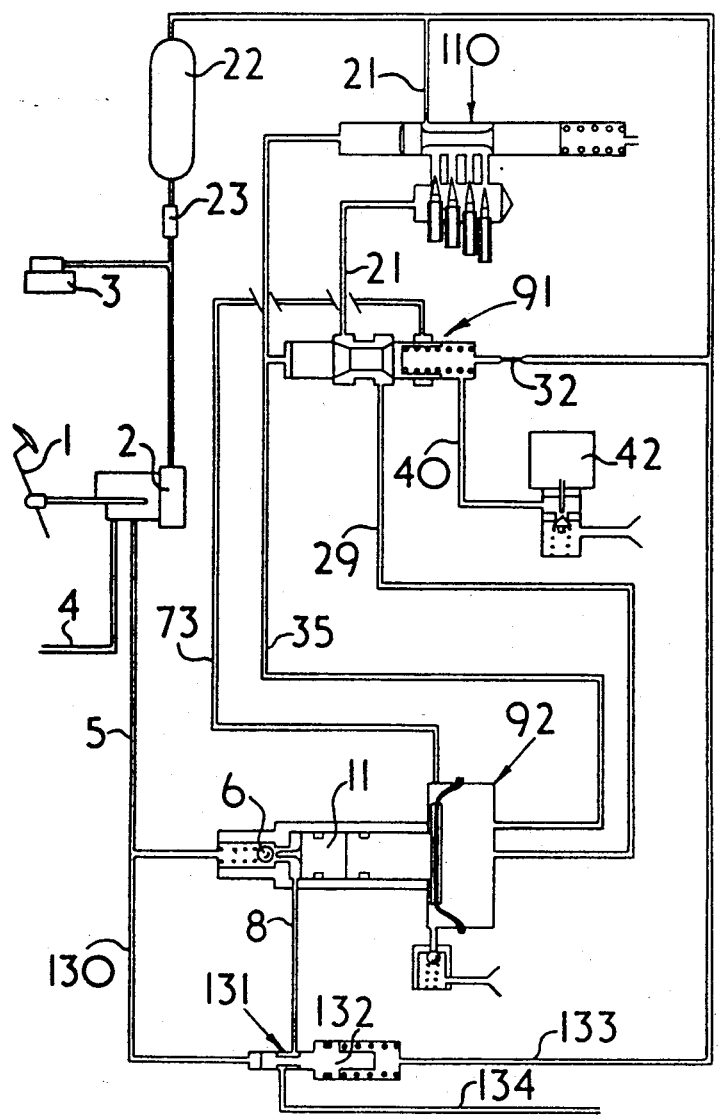

FIGURE 9 shows a system on the lines of those shown in FIGURES 7 and 8 but incorporating an additional safety feature in the form of a by-pass line 130 from the master cylinder 2 to the brakes. The line 130 leads to a valve 131 which is normally held in a closed position by an air pressure actuated plunger 132 connected to the reservoir 22 by a line 133 and which in the closed position as shown in FIGURE 9 is arranged to allow communication between the side connection 8 of the plunger cylinder and a line 134 leading to the brakes. If the air pressure should fail, the cut-off valve 6 would seal off the communication through the line 8 between the brakes and the master cylinder 2, but the valve 131 in the bypass line would open to re-establish direct communication through the lines 130, 134 between the cylinder 2 and the brakes, at the same time cutting off the communication between the brakes and the plunger cylinder.

Figure 10:
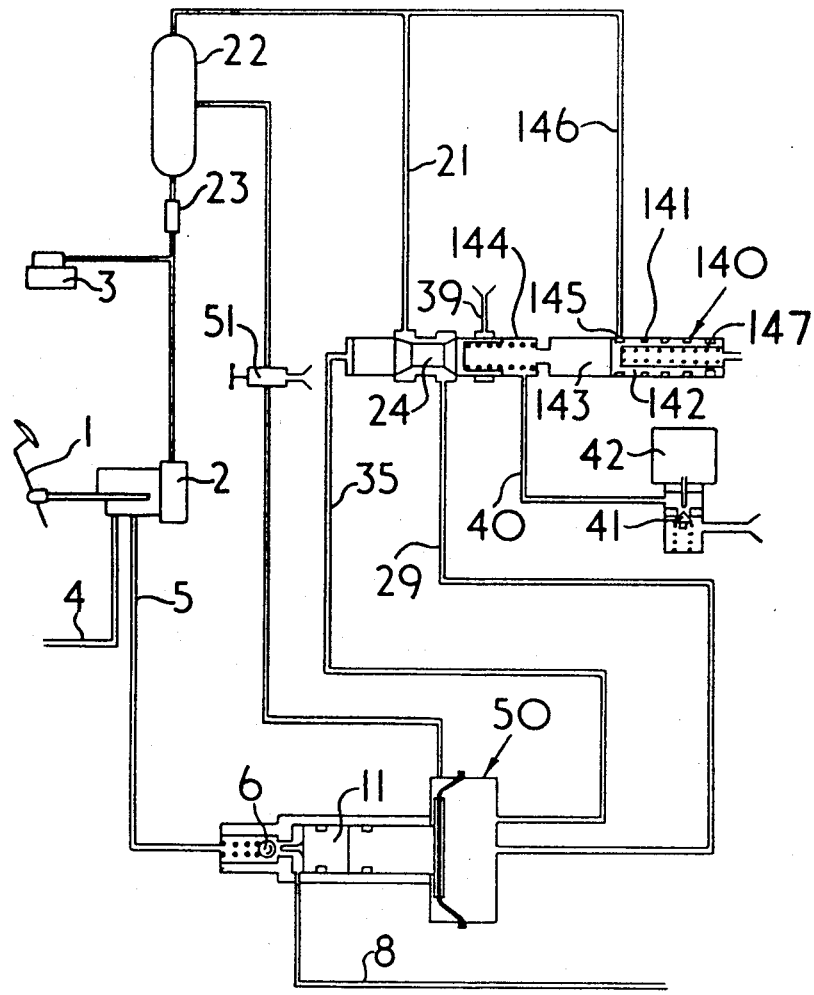

While in the embodiments described above the restrictor 32 is fixed, it may be replaced by a variable restrictor 140 as shown in FIGURE 10. The variable restrictor 140 is of the kind in which a helical groove 141 cut in the outer surface of a piston 142 connects the end 143 of the associated relay valve bore 144 with a port 145 to which air pressure is supplied from the reservoir 22 through a line 146. The position of the piston 142 relative to the port 145 determines the length of groove 141 through which air has to flow from the port 145 to reach the end 143 of the bore 144, and thus the degree of restriction offered to the flow of air. The piston 142 is urged in the direction in which it will provide greater restriction by a spring 147, and is urged in the opposite direction by the pressure present at the end 143 of the relay valve bore 144 which is connected to the skid-sensing device.

The effect of providing the variable restrictor 140 is that the restrictor governs the rate at which pressure is built up at the associated end 143 of the relay valve bore after the valve 41 of the skid-sensing device has closed, providing a relatively rapid build-up of pressure when the pressure already present at the end 143 of the valve is high and a relatively slow build-up of pressure when the pressure already present is low. The pressure build-up at the end 143 of the relay valve bore causes the pressure generated in the servo device 50 to build up at a corresponding rate, since the spool valve member 24 moves to connect the supply of compressed air to the chamber 18 of the servo device whenever the pressure in the end 143 of the valve bore rises to the level of the pressure in the chamber 18, and cuts off the supply when the pressure in the chamber 18 tends to rise above that at the end 143. The brake-applying pressure generated by the plunger 11 under the thrust from the servo device 50 therefore rises at a rate which corresponds to the rate of pressure build-up at the end 143 of the relay valve bore, under the control of the skid-sensing device 42 and the variable restrictor 140.

As explained above in connection with the operation of the variable flow restrictors 90 or 110 which may be provided in the air supply line via the relay valve to the chamber 18 of the servo device, the object of introducing a variable restrictor is to provide a gradual re-application of the brakes when the pressure in the servo device has fallen to a low value, and a more rapid re-application of the brakes when the pressure in the servo device can rise to a higher value before a further skid is provoked.

The variable restrictor associated with the skid-sensing device may be used in place of, or in addition to, the variable flow restrictor in the air supply in the servo device.

Figure 11:
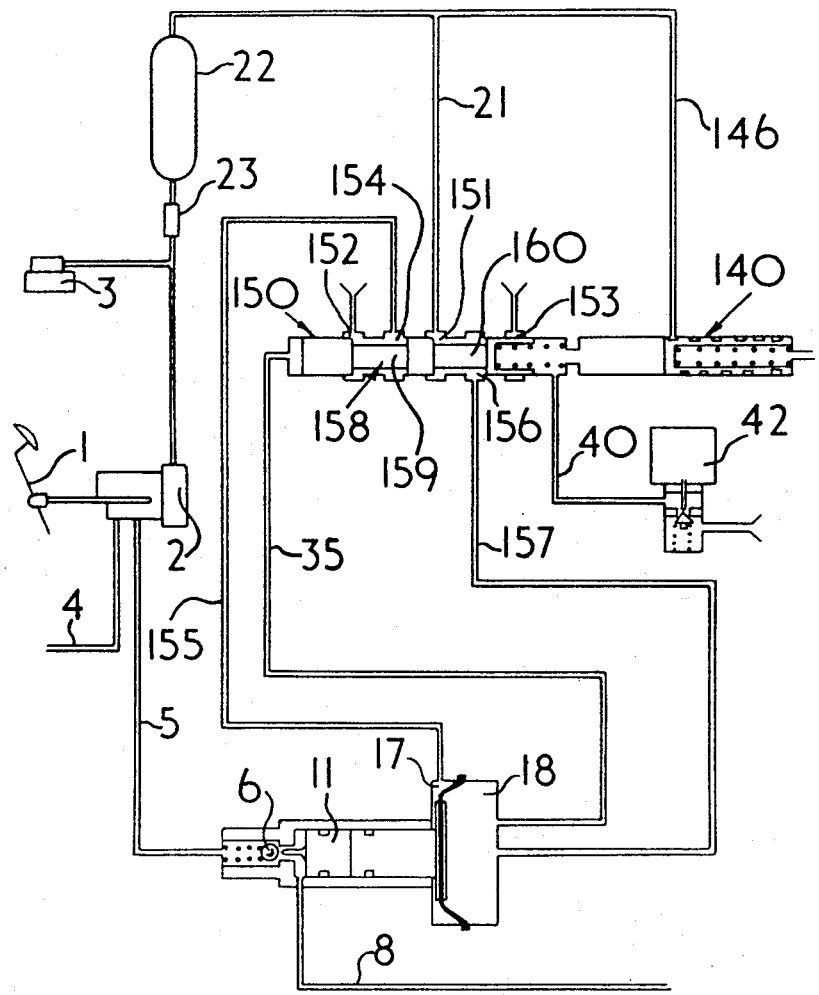

FIGURE 11 shows a further alternative arrangement for control of the pressures in the chambers 17 and 18 of the servo device by means of a modified relay valve 150. The relay valve 150 is provided with an air pressure inlet port 151, and exhaust ports 152 and 153. The chamber 17 is connected to a port 154 by a line 155 and the chamber 18 is connected to a port 156 by a line 157.

The relay valve 150 comprises a spool valve member 158 which operates in a similar manner to the member 24 of the embodiments described above, but the arrangement of the ports relative to the reduced-diameter portions 159, 160 of the member 158 is such that the relay valve operates the servo device 50 in a double-acting manner: when the valve 150 is in its normal state the chamber 18 is connected to the air pressure line 21 and the chamber 18 to exhaust, and when the valve 50 is operated by the skid-sensing device 42 the chamber 18 is connected to exhaust and the chamber 17 to the air pressure line 21.

The systems described above all have the advantage that the operation of the servo device which controls the release and re-application of the brakes is not controlled directly by the relatively small valve of the skid-sensing device, but is controlled by opening and closing relatively large valve ports in the relay valve. This enables release and re-application of the brakes to take place very much more rapidly than in a system in which no relay valve is provided, and thus provides a considerably improved performance in correcting or preventing skidding. Although the present invention has been illustrated and described in connection with a certain selected example embodiment, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

Having now described our invention what we claim is:

1. A vehicle braking system comprising a source of hydraulic pressure, a control cylinder connected to the source of hydraulic pressure, a hydraulic brake operating mechanism associated with the brake of at least one wheel of the vehicle, said brake operating mechanism being normally connected to the control cylinder and to the source of hydraulic pressure, a cut-off valve for interrupting the connection between the source of hydraulic pressure and both the control cylinder and the brake operating mechanism, a plunger movably located in the control cylinder and arranged to control independently of increase of the brake applying effort the hydraulic pressure in the brake-operating mechanism after the cut-off valve has interrupted the connection between the source of hydraulic pressure and the brake operating mechanism, means for controlling the position of the plunger comprising a pneumatically operated servo device arranged to apply a thrust to the plunger, the operation of the servo device being controlled by a relay valve, and a skid-sensing device associated with the vehicle wheel and arranged to operate the relay valve so as to cause the thrust exerted on the plunger by the servo device to be reduced when the wheel tends to lock.

2. A system according to claim 1 wherein the servo device comprises a movable member connected to the plunger and mounted in a housing having a first chamber and a second chamber on opposite sides of the movable member, the relay valve being arranged to control the supply of air pressure to at least one of the chambers so as to cause the thrust exerted on the plunger by the servo device to be reduced when the wheel tends to lock.

3. A system according to claim 2 wherein the first chamber is vented to atmosphere and the second chamber is arranged normally to be connected by the relay valve to a supply of air pressure and to be sealed from the supply and connected to atmospheric pressure when the wheel tends to lock.

4. A system according to claim 2 wherein the first chamber is connected through a reducing valve to a supply of air pressure and is provided with a pressure relief valve, the second chamber being arranged normally to be connected by the relay valve to a supply of air pressure and to be sealed from the supply and connected to atmospheric pressure when the wheel tends to lock.

5. A system according to claim 2 wherein the first chamber is vented to atmosphere through a pressure relief valve arranged to retain a predetermined pressure therein and the second chamber is arranged normally to be connected by the relay valve to a supply of air pressure, the relay valve being arranged to seal the second chamber from the supply and to connect the chambers to one another when the wheel tends to lock.

6. A system according to claim 2 wherein the relay valve is arranged normally to connect the first chamber to atmosphere and the second chamber to a supply of air pressure, and to reverse the connections to the two chambers when the wheel tends to lock.

7. A system according to claim 2 wherein the relay valve comprises a spool valve member slidable in a bore of a housing having ports associated with the servo device and an air pressure supply to control the supply of pressure to at least one of the chambers of the servo device in accordance with the position of the spool valve member in the bore, the bore being connected at one end to the second chamber and the bore being connected at the other end to a valve of the skid-sensing device and through a restrictor to the supply of air pressure, a spring being provided to urge the spool valve member towards a normal position adjacent the end of the bore connected to the second chamber and the arrangement being such that when the wheel tends to lock the valve of the skid-sensing device opens to release pressure from the associated end of the bore and thereby to cause the spool valve member to move from its normal position to a position in which it makes appropriate connections between the ports in the bore of the housing to cause the thrust exerted on the plunger by the servo device to be reduced.

8. A system according to claim 7 wherein the relay valve housing is secured to the wall of the second chamber of the servo device, the wall of the chamber and the housing having communicating openings, sealed from atmosphere, to provide communication between the second chamber and the appropriate ports of the relay valve.

9. A system according to claim 7 wherein the housing of the relay valve is provided with a single air pressure inlet connected to a port in the valve bore and wherein the restrictor is contained in the spool valve member and communicates at one end through a passage formed in the spool valve member with the air pressure inlet port in all positions of the spool valve member, the other end of the restrictor being in communication with the end of the bore connected to the valve of the skid-sensing device.

10. A system according to claim 8 wherein the servo device is provided with an axially extending tube secured to the wall of the second chamber and passing through a central opening in a diaphragm in fluid-tight sliding engagement therewith to communicate with the first chamber, the tube providing a passage from a port of the relay valve to the first chamber.

11. A system according to claim 10 wherein the spool valve member is arranged so that when the relay valve is operated by the skid-sensing device as a result of a tendency for the wheel to lock the spool valve member seals the second chamber from the air pressure supply and connects the opening from the second chamber to the relay valve port associated with the tube to establish communication between the two chambers.

12. A system according to claim 9 wherein a pressure reducing valve is mounted in a second bore of the relay valve housing connected to the air pressure inlet and is arranged to feed a reduced pressure to the first chamber of the servo device, a pressure relief valve being provided to limit the pressure developed in the first chamber.

13. A system according to claim 2 wherein a variable flow-restrictor is provided to control the rate at which air pressure is supplied by the relay valve to the servo device to cause re-application of the thrust exerted on the plunger by the servo device following an operation of the system to check an incipient skid, the variable flow-restrictor comprising means for providing a relatively restricted flow of air when the thrust exerted by the servo device is low and a relatively less restricted flow of air when the thrust exerted by the servo device is high.

14. A system according to claim 13 wherein the flow-restrictor comprises a restrictor valve member attached to a restrictor plunger which is movable in a cylindrical bore of a restrictor valve housing, one end of the bore being connected to the second chamber of the servo device and a restrictor return spring being provided to oppose movement of the restrictor plunger under the pressure from the second chamber, the bore having openings through which air pressure may be supplied to the servo device and the restrictor valve member being arranged in the bore to restrict the flow of air to the second chamber to a greater extent when the pressure in the second chamber is low than when the pressure is high.

15. A system according to claim 14 wherein the air pressure supply to the second chamber of the servo device is arranged to flow across the bore of the restrictor housing through openings disposed on opposite sides of the bore, and wherein the restrictor valve member is of tapering cross-section and is arranged to be moved by the pressure from the second chamber of the servo device, acting on the restrictor plunger attached to the restrictor valve member, towards a position offering a reduced obstruction to the flow of air across the bore.

16. A system according to claim 14 wherein the bore of the restrictor valve housing is provided on one side with a series of openings in spaced positions along the bore and a single opening on the diametrically opposite side of the bore, each opening of the series of openings being arranged so that it can be closed by the valve member and being provided with a needle valve through which air can flow through a common passage at one side of the restrictor valve housing, the needle valve being adjusted to prevent a series of orifices of graduated sizes and the arrangement being such that the series of orifices can be opened in succession by movement of the restrictor valve member along the bore to provide a relatively reduced obstruction to the flow of air across the bore as the pressure in the second chamber of the servo device increases.

17. A system according to claim 14 wherein the restrictor valve housing forms part of a housing for the relay valve.

18. A system according to claim 7 wherein the restrictor through which the end of the relay valve bore associated with the skid-sensing device is connected to the air pressure supply is variable, to provide a relatively great restricting effect when the pressure at the said end of the valve is low and a relatively small restricting effect when the pressure is high.

19. A system according to claim 18 wherein the restrictor through which the end of the relay valve bore associated with the skid-sensing device is connected to the air pressure supply is constituted by a piston having a helical groove cut in its outer surface and slidable in an associated cylinder having a port communicating with the groove, the position of the grooved piston relative to the port in its associated cylinder determining the degree of restriction offered to the flow of air, the grooved piston being urged by a spring in the direction in which it will provide a greater restriction, and being urged in the opposite direction by the pressure present at the end of the relay valve bore which is connected to the skid-sensing device.

20. A system according to claim 1 wherein a by-pass line is provided for conveying hydraulic pressure to the brake independently of the position of the cut-off valve, the by-pass line incorporating a valve spring-urged towards an open position but normally held in a closed position by the pneumatic pressure supplied to the servo device.

21. An articulated vehicle comprising a tractor portion and a semi-trailer portion and having a braking system as claimed in claim 1 associated with the rear wheel brakes of the tractor portion.

References Cited

UNITED STATES PATENTS

| 3,269,781 | 8/1966 | Van House | 303—6 |
| 3,306,677 | 2/1967 | Dewar et al. | 303—21 |

DUANE A. REGER, *Primary Examiner.*